United States Patent [19]

Ikesue

[11] 4,083,511

[45] Apr. 11, 1978

[54] SEAT BELT RETRACTOR

[75] Inventor: Haruyuki Ikesue, Fujisawa, Japan

[73] Assignee: NSK-Warner K. K., Fujisawa, Japan

[21] Appl. No.: 670,966

[22] Filed: Mar. 26, 1976

[30] Foreign Application Priority Data

Apr. 3, 1975 Japan .............................. 50-44185[U]
Jun. 5, 1975 Japan .............................. 50-75303[U]

[51] Int. Cl.² ...................... A62B 35/02; B65H 75/48
[52] U.S. Cl. ...................... 242/107.4 A; 242/107.4 B
[58] Field of Search ................. 242/107.4 A, 107.4 B; 280/744–747; 297/388

[56] References Cited

U.S. PATENT DOCUMENTS

| 3,482,799 | 12/1969 | Wrighton et al. | 242/107.4 B |
| 3,578,260 | 5/1971 | Kell | 242/107.4 A |
| 3,758,044 | 9/1973 | Nilsson | 242/107.4 A |
| 3,834,646 | 9/1974 | Heath | 242/107.4 A X |
| 3,941,330 | 3/1976 | Ulrich | 242/107.4 B X |

FOREIGN PATENT DOCUMENTS 1,356,257  12/1974  United Kingdom ......... 242/107.4 A Primary Examiner—Harvey C. Hornsby
Assistant Examiner—John M. Jillions
Attorney, Agent, or Firm—Robert V. Jambor

[57] ABSTRACT

A seat belt retractor having a dual lock means including a webbing sensitive lock for detecting a rate of webbing payout in excess of a predetermined rate and an impact lock for determining vehicle deceleration in excess of a predetermined rate, each of said locks being independently actuated upon detection of each said excess rate. In a preferred form said locks are actuable at different rates of vehicle deceleration to provide sequential initiation of the independent locking functions.

6 Claims, 6 Drawing Figures

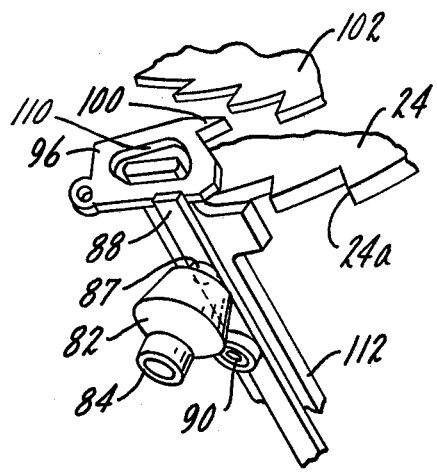
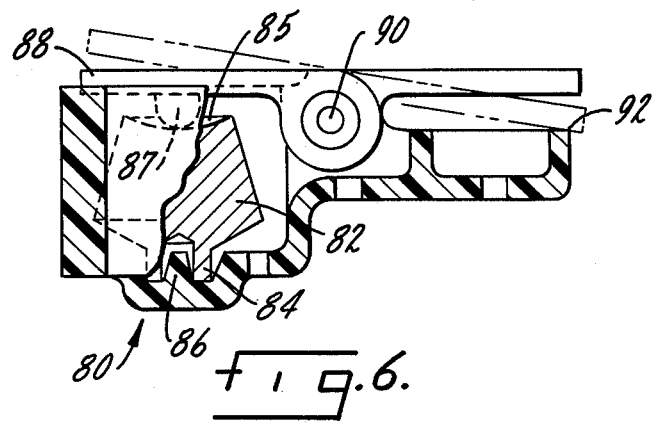

SEAT BELT RETRACTOR

BACKGROUND OF THE INVENTION

This invention relates to seat belt retractors. Due to safety regulations, substantial improvements have been made in the structural design of such devices. Normally, they include spools or spring biased reels which payout a safety webbing about a passenger and simultaneously facilitate his comfortable movement in the buckled position. Further, these safety webbing devices have the capability to sense and lock against webbing payout in the event of a collision or overturning of the vehicle, and this capability is usually accomplished through the use of webbing sensitive lock or a vehicle sensitive lock.

The webbing sensitive locks are illustrated by U.S. Pat. No. 3,450,368, and may employ a rotational spring biased centrifugal counterweight to measure the rate of webbing payout and lock the unit when the rotational force on the counterweight exceeds the associated spring bias. The vehicle deceleration locks may be illustrated by U.S. Pat. No. 3,578,260, in which a pendulum, pivoted by a rapid deceleration, locks the webbing against further payout. Moreover, as in U.S. Pat. No. 3,819,126 both systems have been incorporated into a single retraction device. The device of that patent includes only one locking pawl operable by either a vehicle sensitive or a webbing sensitive actuator. Movement of the pawl toward a locking position may be initiated by whichever sensor first reacts to a change in vehicle condition. Should that movement fail to lock up the reel, there is no reserve function available to accomplish locking of the reel. These prior devices do not, however, provide the safest assurance and simple design of the instant invention.

SUMMARY OF THE INVENTION

In order to provide a seat belt retractor which positively locks against webbing payout in the event of a collision, the instant invention includes a seat belt retractor having a base journaling a webbing reel which pays out webbing. Constrained for rotation with this reel are ratchet gears at each end thereof which cooperate with a separate locking pawl of a webbing sensitive lock and a deceleration sensitive lock.

Each lock is complete within itself, and is mounted on the base in a simple manner to insure non-interference with the other lock. Moreover, the use of two locks each having a separate locking pawl provides adequate assurance that at least one will engage, in spite of the possibility that one bar may strike the top of the ratchet gears and bounce off without engagement. Preferably the locks are sensitive to different rates of vehicle deceleration to provide initiation of the independent locking functions in a timed sequence. Preferably the vehicle sensitive lock initiates its locking function at a vehicle deceleration rate which is lower than the vehicle deceleration rate necessary to initiate the webbing acceleration sensitive lock. Should the vehicle sensitive lock fail due to misengagement of the locking pawl and rachet wheel, continued deceleration of the vehicle would cause an increase in the rate of webbing payout due to the forces acting on the wearer. The resultant increase in webbing acceleration in turn causes initiation of the independent webbing sensitive lock. Since two separate pawls are utilized, the pawl associated with the webbing sensitive lock is unaffected by the misengagement which occurs between the ratchet wheel and the pawl associated with the vehicle sensitive lock.

Accordingly, it is an object of my invention to provide a seat belt retractor having dual locking devices responding to a vehicle accident. Moreover, it is an object of this invention to assemble such dual locking devices on a seat belt retractor in a simple, economical design facilitating assembly and eliminating the possibility of interference between the locks and the ratchet gears. More importantly, it is an object of my invention to provide a seat belt retractor, which, in the event of collision, will positively result in a lockup to hold the vehicle passenger in a safe restrained position.

DESCRIPTION OF THE DRAWINGS

The manner in which these and other objects of my invention are attained will be made clear through reference to the following specification and drawings in which:

FIG. 5 is a perspective view of the vehicle deceleration lock of the preferred embodiment of my invention;

FIG. 6 is a plan view of the deceleration sensor of FIG. 5.

DETAILED DESCRIPTION

Figure 1:
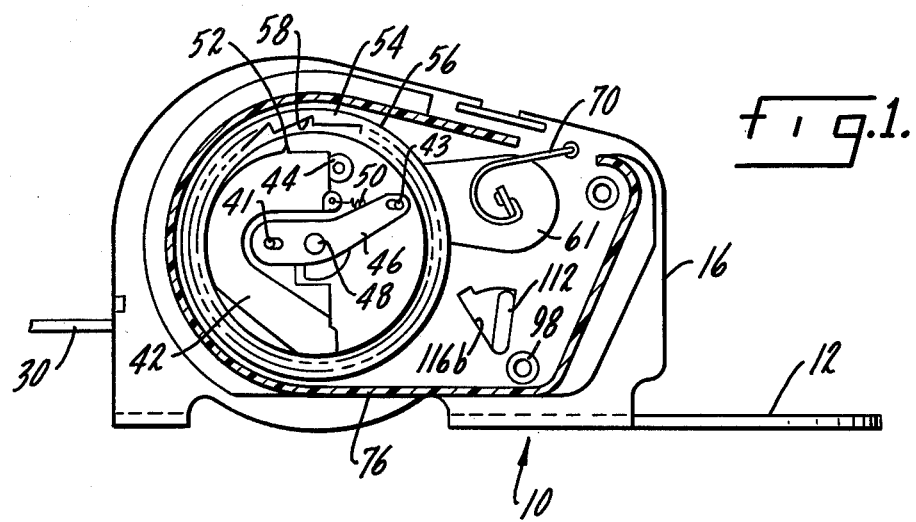
FIG. 1 is a side elevation view, partially broken away, of a preferred embodiment of my invention, depicting the webbing sensitive lock mechanism.
Figure 2:
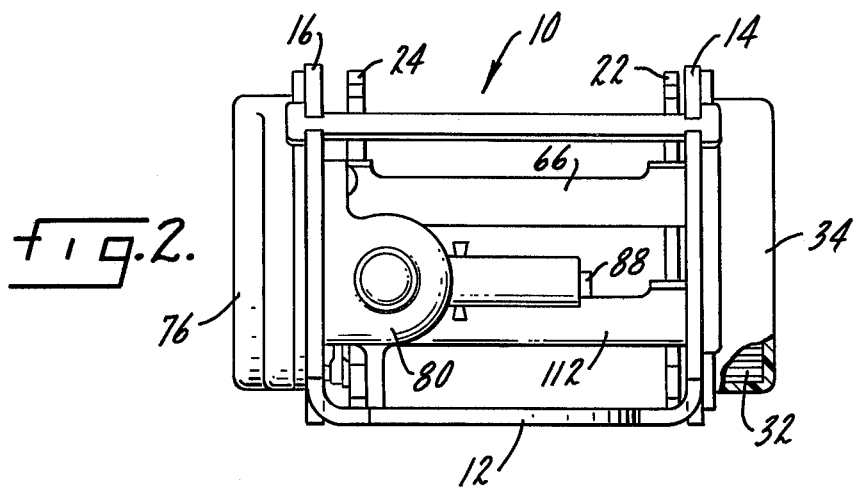
FIG. 2 is a front elevation of FIG. 1.
Figure 3:
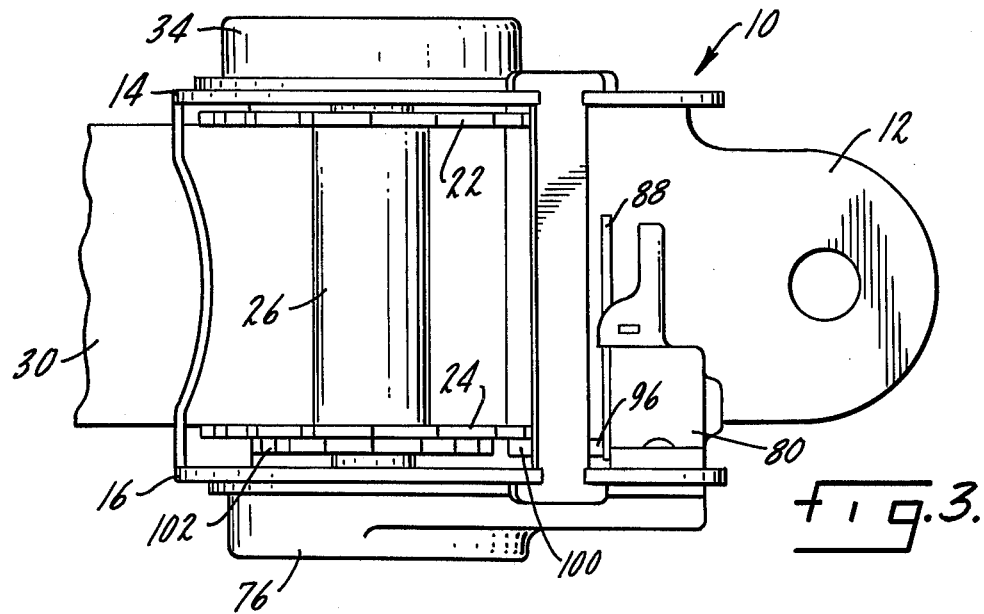
FIG. 3 is a plan view of the embodiment of FIG. 1.
Figure 4:
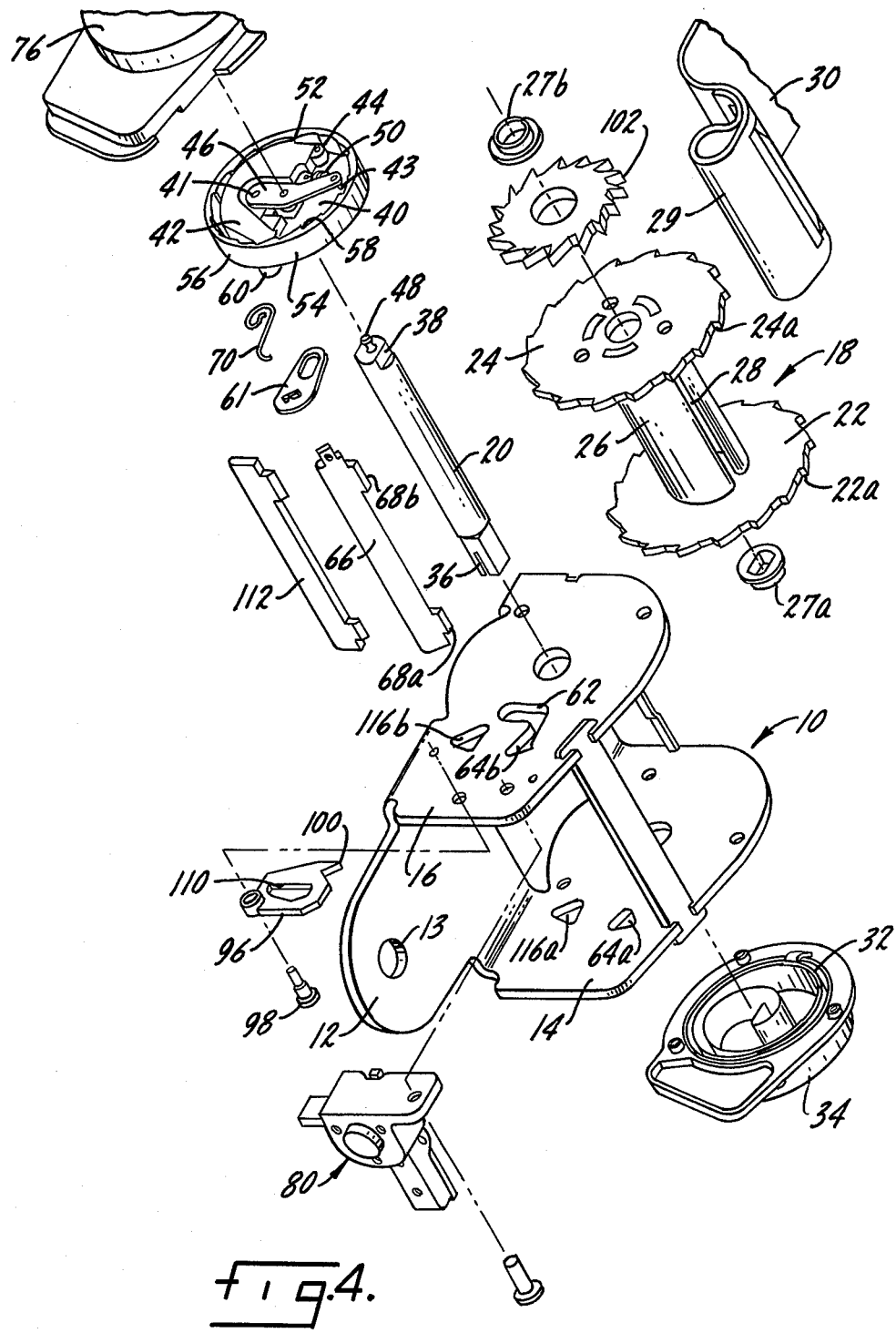
FIG. 4 is an exploded perspective view of this preferred embodiment.

Referring primarily to FIG. 4 of the drawings, the seat belt retractor of my invention is assembled upon a base frame 10, having back section 12 and two upstanding flanges or side plates 14 and 16.

The base 12 is formed with a hole 13 for installing the safety webbing take-up means on a seat or at any other suitable position in a vehicle such as an automobile by a suitable fastening member (not shown). The flanges or side plates 14 and 16 of the frame 10 are formed with respective bearing holes facing each other to journal or rotatably supporting a webbing reel 18 therein. This reel 18 may comprise a shaft 20, flanges 22 and 24, secured thereto and an integral sleeve 26, all constrained for rotation as a unit. Preferably bushings 27a and 27b journal shaft 20 in the plates 14 and 16.

The sleeve 26 may have a C-shaped cross-sectional profile providing an axial slot or opening 28 to receive an end portion 29 of a webbing 30 for attachment to the shaft in a well-known manner. The webbing 30 is attached at one end to the shaft such that it will not be detached therefrom and is wound on the sleeve 26 between opposite side flanges 22 and 24. About the periphery of each of these flanges is formed ratchet gears 22a and 24a, facing in the same direction.

The reel 18 and its webbing 30 is spring biased by a spiral spring 32 towards a take up or retracted position. This spiral spring 32 has its outer end secured to a spring cover 34 mounted upon side plate 14 and has its inner end secured in a slot 36 provided in the corresponding end of the shaft 20 so as to bias the reel 18 in a take up direction. The free end of the webbing 30 carries a latch for coupling to a buckle (not shown).

An end of the shaft 20 extending outwardly of the side plate 16 is a notched portion 38 on which is mounted a disc 40 constrained for rotation with the shaft 20 and sleeve 26. The disc 40 is provided with an eccentric integral boss 41 upon which is pivotally mounted a semi-circular inertial member or counter balance 42 whose center of gravity is located within the boss 41. An abutment 44 is formed on disc 40 adjacent to one end of the inertia member 42, so as to permit relative pivotal movement of member 42 only in the opposite direction.

The member 42 is biased against abutment 44 by a spring 50. The spring is connected to the member 42 intermediate the abutment 44 and boss 41 and anchored to disc 40 upon a boss 43. A plate 46 is connected to the end 48 of the shaft 20. It includes extensions which overlie the boss 41 and the boss 43 to retain the components in place.

As long as the angular acceleration of the shaft 20 is within a predetermined value established by the bias of spring 50, the counterbalance 42 remains in abutting relation to boss 44. However, if the webbing payout acceleration is above a predetermined value, the inertia causes rotation of counterbalance 42 relative the shaft 20 against the biasing force of the coil spring 50, resulting in radial movement of a tooth 52 formed on member 42. This tooth 52 then engages a circular cup member 54 rotatably mounted on a hub portion of the disc 40 and has an outwardly open cylinder portion 56. The internal surface of cylinder portion 56 is provided with a ratchet gear 58 which is engaged by tooth 52 of the inertia member 42, effecting limited rotation of cup 54. Through a projection 60 extending from the rear side of cup 54, limited rotation of the cup is transmitted to an actuating lever 61 having an aperture receiving the projection. This projection 60 also extends into a slot 62 of flange 16 to limit rotation of cup 54.

The actuating lever 61 is coupled to one end of a lock member 66 which extends through sector-shaped openings 64a and 64b formed in the respective side plates 14 and 16, so that the rotation of the cup member 54 is transmitted through the lever 61, to the lock bar 66.

The lock bar 66 has pawls 68a and 68b facing the respective flanges 22 and 24 such that rotational movement of lever 61 moves these pawls into engagement with the respective ratchet gears 22a and 24b to lock the reel 18 against rotation.

In the normal state, the lock member 66 is held out of engagement of the ratchet gears of the flanges 22 and 24 by a return spring 70 biased between the end lock member 66 and side flange 16.

Accordingly, upon normal webbing payout, the counterweight 42 rotates with reel 18. When, as a result of impact, the passenger's weight causes a rate of payout to exceed a predetermined rate as set by the bias of spring 50, the member 42 pivots about boss 41, radially extending tooth 52 into engagement with the teeth on the internal surface of cup member 54. This cup is then rotated as permitted by slot 62 to affect rotation of the lever 61 and rotational movement of pawls 68a and 68b into locking engagement with flanges 22 and 24. Such precludes further payout and holds the passenger in restrained position.

The internal surface of cup member 54 is provided with the same number of ratchet gear teeth 58 as the ratchet wheels or flanges 22 and 24. The teeth formed on cup member are positioned circumferentially with respect to the teeth 22a and 24a such as to insure movement of the pawl 66 into locking position only when a gap between adjacent teeth is presented to the pawl area.

Once established, at assembly, the above described timed relation between the ratchet gear teeth 58 and flange teeth 22a and 24a is maintained due to the fixed relation between the cup member 54 and the lever 61 which are pivotally interconnected. The cup 54 rotates with the reel 18 only when the tooth 52 engages one of the ratchet gear teeth 54. This rotational movement is then transferred through lever 61 to the pawl or lock bar 66. In this way inadvertent tip-to-tip contact between the locking pawl 66 and the teeth 22a and 24a is precluded.

Also, it is important to note that this webbing sensor is externally mounted on flange 16 and provided with cover 76. This external mounting facilitates incorporation of the vehicle deceleration sensor into the frame 10.

This vehicle deceleration lock is most clearly depicted in FIGS. 4–6. The sensing portion is carried within a housing 80 and comprises a sensing weight 82 having a tubular projection 84 seated on a lower wall of the housing 80. The diameter of this projection 84 defines the deceleration force required to tilt the weight. Preferably this weight should be designed to actuate or tilt prior to actuation of the webbing sensor as will be explained. A protuberance 86 extends into the tube 84 for locating or centering the weight. The weight configuration is such that it has a low centroid so as to facilitate return to the upstanding position.

The top of the acceleration sensing weight 82 is formed with spherical recess 85 which receives a projection 87 depending from a lever 88 rotatably mounted at its center 90. The lever 88 is rotated when the acceleration sensing weight is tilted, as will be described hereinafter. The lever has a substantially symmetrical shape with respect to its support point 90, whereby it can be rotated with a small force exerted upon projection 87 by the inclined surface 85 upon tilting of acceleration sensing weight 82. Also, end of lever 88 remote from the lower projection 86, will strike an abutment 92 of the housing 80 when it is rotated a predetermined extent by tilting of the sensing weight 82. This limitation on rotation prevents excessive tilting of weight 82, thereby facilitating return of the sensing unit to its original position. Above the lever 88 is a ratchet lever 96 pivoted upon pin 98 attached to the side plate 16 of the frame with its lower side resting upon lever 88. The ratchet lever 96 has a gear tooth 100 and rests upon lever 88 by virtue of its weight. However, when the lever 88 is tilted with a vehicle speed change at a rate in excess of a predetermined value, ratchet lever 96 is pivoted upward and brought into a second position such that gear tooth 100 will engage a separate ratchet gear 102 which is mounted adjacent flange 24 and constrained for rotation therewith.

The ratchet lever 96 has a central hole or opening 110 which loosely receives an end of a second lock bar 112 extending through and supported in sector-shaped holes 116a and 116b in the respective side plates 14 and 16. The lock bar 112 is normally held in a position out of engagement with the ratchet gears on the flanges 22 and 24 of the reel 18. However, when the ratchet lever 96 is rotated engagement with the ratchet gear 102, further rotation of reel 18 results in further rotation of ratchet lever 96 with locking bar 112 being moved into locking relationship with the gear teeth of flange 22 and 24. Accordingly, the opening 110 of the ratchet lever 96 and the end portion of the lock bar 112 should be related to each other such that the lock bar is rotated to the locking position when the ratchet lever 96 is rotated by the rotating force of the ratchet gear 102. It should be noted that the locking bar 112 is, however, merely rotated by lever 96, and that the sector shaped holes 116a and 116b still permit abutting force of lock bar 112 to be transmitted to side flanges 14 and 16. As in the case of the lock sensitive to webbing payout, the circumferential relationship of the gear tooth 100, the teeth of ratchet gear 102, and the teeth 22a and 24a of the flanges 22 and 24 is established at assembly such that movement of the locking bar 112 occurs only when the pawls are free to enter between adjacent teeth formed on the flanges. That is, engagement of tooth 100 with gear 102 occurs only at a circumferential position such that pivotal movement of ratchet lever 96 moves pawl bar 112 into the locking position in the gap between adjacent teeth on the flanges 22 and 24. In this way the danger of pawl contact with the tip of teeth 22a and 24a and consequent misengagement is effectively eliminated.

In normal operation, the acceleration sensing weight 82 is held in its upstanding position shown in FIG. 6 so that the ratchet lever 96 is in its position out of engagement with the ratchet gear 102 and lock bar 112 is also out of locking position.

Also, in this state, the webbing can be easily withdrawn or retracted by the passenger's movement against the force of the spiral spring 32. At this time, the inertia member 42 of webbing sensor is rotated in unison with shaft 20.

When the vehicle decelerates at a rate in excess of the predetermined value due to a collision or other causes, the acceleration sensing weight 82 is tilted due to its inertia, thus raising the projection 87 to turn the lever 88 about its support pin 90. As a result, the ratchet lever 96 is rotated about the pin 98 by the end of the lever 88, thus bringing the gear tooth 100 into engagement with the ratchet gear 102.

Meanwhile, with the above acceleration, the passenger bearing the safety webbing experiences a force tending to fling him forward, whereby the webbing is quickly taken out, causing rotation of the reel 18 and ratchet gear 102. Thus, as soon as the ratchet lever 96 engages the ratchet gear 102, it is further rotated, causing the rotation of the lock bar 112 into engagement with the ratchet gears of the flanges 22 and 24 to lock the reel.

Preferably the locking arrangement responsive to the speed of webbing payout, i.e., speed of rotation of the reel 18, is set to be less sensitive than the locking arrangement responsive to changes in vehicle acceleration, i.e., movement of inertial weight 82. In this way the vehicle sensitive locking mechanism will react first. It may be set to operate at the threshold of impact considered to provide maximum passenger safety. The webbing sensitive locking mechanism on the other hand may be set at a higher point of sensitivity to allow for freedom of movement of the passenger and initial payout of the webbing for use without experiencing the annoyance of inadvertent lock-up of the reel.

In the event of failure of the locking bar 112 to lock-up properly with teeth 22a and 24a of the reel 18, the existing impact conditions will cause the passenger to exert further load on the webbing 30 resulting in more rapid webbing payout. The webbing sensitive locking mechanism may then operate to lock the reel 18 and protect the vehicle occupant from injury.

The webbing sensitive mechanism operates to lock-up the reel with a separate pawl bar 66. The earlier misengagenment of the locking bar 112 has no effect on the availability of the webbing sensitive mechanism to lock the reel.

Accordingly, my invention combines a webbing sensitive and vehicle sensing locks into a unique compact retractor providing dual locking safety concept without possible interference between the locks. Common to both locks, is the feature that webbing payout is required to fully actuate each unit. This results even with the vehicle deceleration unit, in that ratchet 102 must rotate lever 96 in order to move the lock bar 112 into holding position. This movement, however, is due to positive engagement between tooth 100 and gear 102 and is not sensitive to the rate of webbing payout. By using separate lock bars, the possibility of precluding lock-up by engaging the tip of the teeth of flanges 22 and 24 is virtually eliminated.

I claim:

1. A seat belt retractor having,
   (a) a frame including a base and an outwardly extending flange on two opposite sides;
   (b) a webbing reel journaled between said flanges and having ratchet gears constrained for rotation with said reel;
   (c) biasing means connected to said reel biasing said reel in a direction to take up webbing upon the reel;
   (d) locking means responsive to a rate of webbing payout in excess of a predetermined rate comprising:
      1. a first locking bar supported by said flanges and movable to engage said ratchet gears to preclude payout of said webbing;
      2. a centrifugal counterweight rotatable with said reel for sensing the rate of webbing payout;
      3. operating means interposed between said counterweight and said first locking bar engagable by said weight in response to payout of webbing in excess of said predetermined rate and operable by continued rotation of said reel to move said first locking bar into engagement with said ratchet gears;
      4. biasing means urging said centrifugal counterweight out of engagement with said operating means, said biasing means establishing said predetermined rate of webbing payout in excess of which said weight engages said operating means;
   (e) and locking means responsive to changes in vehicle acceleration comprising:
      1. a second locking bar supported by said flanges and movable to engage said ratchet gears to preclude payout of said webbing;
      2. a secondary ratchet gear constrained for rotation with said reel;
      3. a ratchet lever mounted on one of said flanges for controlled engagement of said second locking bar and having a non-locking position, an intermediate position wherein said lever is engagable by said secondary ratchet gear and a locking position;
      4. inertia sensitive means responsive to changes in vehicle acceleration engagable with said ratchet lever to move said lever from said non-locking position to said intermediate position in response to a predetermined change in vehicle acceleration;
      5. rotation of said webbing reel in the direction of webbing payout with said ratchet lever in said intermediate position engaging said secondary ratchet gear with said ratchet lever and continued rotation moving said ratchet lever to said locking position;

6. movement of said ratchet lever to said locking position causing said lever to engage and move said second locking bar into engagement with said ratchet gears;

7. said inertia sensitive means being sized in relation to the size of said biasing means of said locking means sensitive to the rate of webbing payout such that upon subjecting said safety belt retractor to a change in vehicle acceleration which simultaneously imparts to the webbing by the wearer a force in the direction of webbing payout, said inertia sensitive means will operate said ratchet lever to move said ratchet lever from said non-locking to said intermediate position prior to said centrifugal counterweight operating against the bias of said biasing means to engage said operating means interposed between said weight and said first locking bar.

2. A safety seat belt retractor as claimed in claim 1 wherein said inertia sensitive means includes a tiltable weight and an operating lever contacting said weight and said ratchet lever to move said lever from said non-locking position to said intermediate position in response to said predetermined change in vehicle acceleration.

3. An apparatus as claimed in claim 2 wherein said operating lever is pivotal and includes a first portion extending from said pivot having an end contacting said ratchet lever and said portion contacting said weight intermediate said end and said pivot, said lever further including a second portion extending from said pivot and counterbalancing said first portion.

4. An apparatus as claimed in claim 3 wherein said tiltable weight is supported in a housing and said housing includes a stop surface, and said second portion of said pivotal lever includes an end engagable with said stop surface to define a limit of pivotal movement of said lever and the tilting movement of said weight.

5. An apparatus as claimed in claim 2 wherein said tiltable weight includes a generally cylindrical support portion supporting said weight for tiltable movement, the diameter of said cylindrical support affecting the predetermined rate of vehicle deceleration necessary for movement of said ratchet lever to its intermediate position.

6. A safety seat belt retractor as claimed in claim 1 wherein said ratchet lever includes a toothed portion positively engagable by said secondary ratchet gear when said ratchet lever is in said intermediate position, rotation of said secondary ratchet gear in the direction of webbing payout thereby positively moving said ratchet lever from said intermediate position to said locking position.

* * * * *